United States Patent [19]

Lucas

[11] Patent Number: 5,674,936
[45] Date of Patent: Oct. 7, 1997

[54] NON-CORROSIVE TRANSLUCENT RTV COMPOSITIONS HAVING GOOD RHEOLOGY

[75] Inventor: Gary M. Lucas, Scotia, N.Y.

[73] Assignee: General Electric Company, Pittsfield, Mass.

[21] Appl. No.: 688,593

[22] Filed: Jul. 30, 1996

Related U.S. Application Data

[63] Continuation-in-part of Ser. No. 644,791, May 10, 1996.

[51] Int. Cl.$^6$ ........................................... C08K 5/24
[52] U.S. Cl. .................. 524/731; 524/868; 524/869; 528/17; 528/33; 528/34
[58] Field of Search ..................... 528/17, 33, 34; 524/868, 869, 731

[56] References Cited

U.S. PATENT DOCUMENTS

| | | |
|---|---|---|
| 3,065,194 | 11/1962 | Nitzsche et al. . |
| 3,340,067 | 9/1967 | Weyenberg . |
| 3,542,901 | 11/1970 | Cooper et al. . |
| 3,689,454 | 9/1972 | Smith et al. . |
| 3,779,986 | 12/1973 | Smith et al. . |
| 4,257,932 | 3/1981 | Beers . |
| 4,461,867 | 7/1984 | Suprenant .................... 528/33 |
| 4,472,551 | 9/1984 | White et al. . |
| 4,483,973 | 11/1984 | Lucas et al. .................. 528/33 |
| 4,499,234 | 2/1985 | Pratt et al. . |
| 4,505,209 | 3/1985 | Strohmeyer, Jr. . |
| 4,515,932 | 5/1985 | Chung . |
| 4,528,353 | 7/1985 | Lucas et al. . |
| 4,563,498 | 1/1986 | Lucas . |
| 4,578,492 | 3/1986 | Pratt et al. . |
| 4,593,085 | 6/1986 | Lucas . |
| 4,670,532 | 6/1987 | Lucas . |
| 4,755,578 | 7/1988 | Lucas . |
| 4,863,992 | 9/1989 | Wengrovius et al. . |
| 4,863,993 | 9/1989 | Montgomery . |
| 4,895,918 | 1/1990 | Lucas . |
| 5,093,454 | 3/1992 | Fujimoto et al. .................. 528/17 |
| 5,166,296 | 11/1992 | Wengrovius et al. . |
| 5,213,899 | 5/1993 | Lucas . |
| 5,420,196 | 5/1995 | Lucas . |

*Primary Examiner*—Melvyn I. Marquis
*Attorney, Agent, or Firm*—Kenneth S. Wheelock

[57] ABSTRACT

A room temperature vulcanizable silicone composition having an application rate greater than 150 g/min. and good thixotropy comprises an alkyl alkoxy stopped diorganopolysiloxane, a polyalkoxysilane crosslinking agent, a tetra alkyl titanate condensation cure catalyst, and 1,3,5-tris(alkoxysilylalkyl)isocyanurate.

7 Claims, No Drawings

NON-CORROSIVE TRANSLUCENT RTV COMPOSITIONS HAVING GOOD RHEOLOGY

CROSS-REFERENCE TO RELATED APPLICATIONS

This is a continuation-in-part of copending application Ser. No. 08/644,791 filed on May 10, 1996.

FIELD OF THE INVENTION

The present invention relates to room temperature vulcanizable silicone sealant compositions that are colorless, translucent, and non-corrosive having improved rheological properties.

BACKGROUND OF THE INVENTION

The combination of polyalkoxy terminated polydimethylsiloxane (polydimethylsiloxane) polymers, reinforcing fumed silica fillers, polyalkoxysilane crosslinking agents, and condensation cure catalysts can be combined to yield translucent, shelf-stable, fast curing, one and two-part room temperature vulcanizable sealants. The condensation catalysts utilized in these formulations are typically various dialkyl metal chelates, particularly the chelating carboxylic acid salts of those metals. These sealants have the improved property of being less corrosive relative to room temperature vulcanizable silicone compositions that make use of an alkoxy curing mechanism.

The term stable, in referring to one-part polyalkoxy terminated organopolysiloxane room temperature vulcanizable compositions, has typically been taken to mean a moisture curable mixture capable of remaining substantially unchanged while excluded or protected from atmospheric moisture that cures to a tack free elastomer when exposed to atmospheric moisture. Additionally, the term stable also means that the tack free time exhibited by freshly mixed room temperature vulcanizable sealants will be independent of storage time at ambient conditions. An accelerated shelf stability test measures this property by heating such a composition at 70° C. for 5 days. Compositions that exhibit similar tack free times after being subjected to this accelerated shelf stability test are considered stable.

The term non-corrosive refers to a particular specification and test protocols designed to qualify room temperature vulcanizable silicone compositions for military specification Mil-A-46146B. Briefly one test involves extruding a known weight of the silicone composition into a test jar, covering the silicone with water and suspending corrosion test coupons of brass steel and aluminum in the water that is in contact with the silicone. The procedure is repeated without the silicone as a control. The jars are maintained at 100±3.6° F. for a period of 168±4 hours (7 days). Silicone samples that discolor or corrode the test coupons are considered to have failed the test. A similar test involves testing copper wire that is encapsulated in the test silicone curing the encapsulated wire for 168±4 hours at 50±5% relative humidity at 23° C. and aging the encapsulated wire at 120±2° F. in 95–98% relative humidity for 28 days. Any showing of corrosion relative to a control indicates failure.

An improved, low odor, substantially non-corrosive one part room temperature vulcanizable composition is disclosed in U.S. Pat. No. 4,257,932. The reduction in odor and corrosive properties, relative to one part room temperature vulcanizable silicone compositions that cure by releasing acetic acid, was achieved by utilizing as a crosslinking silane, a less volatile acidic leaving group such as methyl-tris-(2-ethylhexanoxy)silane. The use of methyl-tris-(2-ethylhexanoxy)silane is commonly referred to as an octoate curing system. The octanoic acid released by the curing process in this composition is not volatile, hence the low odor, but it does still corrode metals on contact.

U.S. Pat. No. 3,065,194 discloses a mixture of a hydroxy or alkoxy endstopped polydimethylsiloxane polymer, inert filler, ethylorthosilicate and dibutyl tin dilaurate are curable upon contact with water or moisture. These compositions suffer from an apparent reduced shelf life of only fourteen days.

Other attempts to develop translucent, fast curing, non-corrosive one-part room temperature vulcanizable silicone sealants involved compositions comprising polyalkoxysilane crosslinking agents with silanol terminated polydimethylsiloxane polymers that utilize titanium chelate catalysts instead of tin catalysts (U.S. Pat. Nos. 3,334,067; 3,542,901; 3,689,454; and 3,779,986).

The beta-diketonate dialkyl tin compounds have been employed in conjunction with a scavenger free polyalkoxy terminated polydimethylsiloxane polymer and polyalkoxy crosslinking agent to yield colorless, translucent, shelf-stable one-part room temperature vulcanizable compositions (U.S. Pat. Nos. 5,166,296 and 4,863,993). In these compositions, shelf stability is maximized when the tin catalyst is dibutyl tin diacetylacetonate, although the composition is somewhat opaque and slightly yellow. The acetylacetone in the formulation results in the corrosion or discoloration of copper and brass substrates. Compositions that are free of the offending acetylacetone utilizing for example ethylacetoacetate do produce non-corrosive room temperature vulcanizable compositions, however these compositions are not particularly shelf stable and must be used quickly. Tin catalysts that contain substituted acetylacetonate as the chelating agent will undergo ligand exchange in the presence of free methanol, forming tin methoxy complexes that act as polydimethylsiloxane equilibration catalysts. This presents a problem because the catalyzed equilibration results in the formation of dimethyl mono-alkoxy terminated polydimethylsiloxane polymers which do not cure.

A process for endcapping polydimethylsiloxane to form the polyalkoxy endstopping groups necessary for crosslinking utilizes a Lewis acid in combination with an amine as the endcapping catalyst (U.S. Pat. No. 4,515,932). This reaction does not exhibit a particularly high yield. For example, endcapping a silanol endstoppped (endcapped) polydimethylsiloxane using dimethyltetramethoxysilazane in the presence of di-n-hexylamine and various acids yields only about a 21% conversion to the desired methyldimethoxy endcap when the acid is formic acid. While higher molecular weight acids such as acetic acid will yield 100% of the desired methyldimethoxy endcap, the use of hydroxy or methanol scavengers becomes necessary for stability.

The use of dialkyl tin dicarboxylates as condensation cure catalysts for alkoxy functional one part room temperature vulcanizable silicone compositions is disclosed in several U.S. Pat. Nos. (4,593,085; 4,670,532; 4,755,578; 4,895,918; 4,505,209; 4,563,498; and 4,528,353). However, in order to obtain long term stability of the composition, i.e. shelf stability, the dialkyl tin dicarboxylate catalyzed compositions require the presence of amino silanes or silazanes as in-situ methanol scavengers. These scavengers are not without their own problems. For example, the reaction between methanol and hexamethyldisilazane results in the release of ammonia, which has an unpleasant odor and a corrosive effect, particularly on copper containing alloys such as brass.

While it is desirable to be able to prepare translucent silicone sealants that are non-corrosive they must also have properties that render them convenient to use prior to cure. Thus uncured silicone sealants must be easy to pump and extrude, i.e. they must have a high application rate, and they must possess good thixotropy. A particularly common method of imparting good thixotropic behavior is to prepare the silicone sealant composition with fairly high levels of a treated or untreated fumed silica filler. However, the high weight percent levels necessary for good thixotropy, e.g. 20 wt. % and greater, typically have a large adverse effect on application rate. When the weight percent silica content is lowered to impart a good application rate, initial thixotropic behavior is usually acceptable. With silica levels below about 20 weight percent in the sealant composition this initially acceptable thixotropic behavior deteriorates upon storage and re-packaging. Pumping and re-packaging of the sealant composition subjects the composition to shearing forces which in many cases reduces the thixotropy of the sealant so significantly that the uncured material flows out of a vertical joint, rendering it useless for its intended purpose. Those 1-part alkoxy compositions that simultaneously possess good application rates and good thixotropic behavior depend on tetravalent tin catalysts and silazane based hydroxy scavengers. The silazane scavengers react liberating ammonia which is corrosive to copper containing alloys. Thus there exists a need for a non-corrosive 1-part silicone sealant composition that has a good application rate of 150 g/min. or more and good thixotropic behavior, i.e. a maximum flow of 0.30 in. (as described in the experimental section).

SUMMARY OF THE INVENTION

The present invention provides for a colorless, translucent, shelf stable, fast curing one-part room temperature vulcanizable silicone composition having good rheological properties consisting essentially of:

(a) 100 parts by weight of a scavenger free polydiorganosiloxane having the formula:

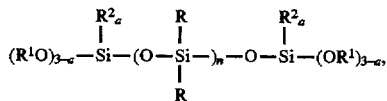

where each R and $R^2$ is independently a substituted or unsubstituted one to fifteen carbon atom monovalent hydrocarbon radical, $R^1$ is a one to eight carbon atom monovalent hydrocarbon radical or a seven to thirteen carbon atom monovalent aralkyl radical, n is a number ranging from about 50 to about 2,500 and a is zero or one, wherein said polydimethylsiloxane has a viscosity ranging from about 100 to about 500,000 centipoise (cps) at 25° C.;

(b) from about 25 to about 40 parts by weight per hundred parts by weight of polymer (a) of a fumed or pyrogenic silica reinforcing filler;

(c) from slightly greater than zero to about 50 parts by weight per hundred parts by weight of polymer (a) of a triorganosilyl endstopped diorganopolysiloxane having the formula:

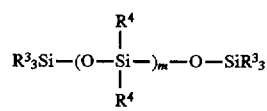

where $R^3$ is selected from the same substituents as $R^1$ and $R^4$ is selected from the same substituents as R and m is chosen so that the viscosity ranges from about 10 to about 5,000 centipoise at 25° C.;

(d) from slightly greater than zero to about 5 parts by weight per hundred parts by weight of polymer (a) of a polyalkoxysilane crosslinking agent having the formula:

where $R^5$ is selected from the same substituents as $R^1$ and $R^6 a$ is selected from the same substituents as $R_2$;

(e) from about 0.10 to about 3.0 parts by weight per hundred parts by weight of polymer (a) of a titanium condensation cure catalyst having the formula: $Ti(OR^7)_4$, where $R^7$ is a one to ten carbon atom monovalent hydrocarbon radical;

(f) from about 0.28 to about 1.50 parts by weight per hundred parts by weight of polymer (a) of a 1,3,5-tris (trialkoxysilylalkyl)isocyanurate having the formula:

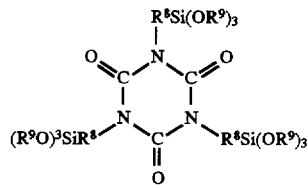

where $R^9$ is selected from the same substituents as $R^1$ and $R^8$ is a divalent hydrocarbon radical having from three to eight carbon atoms whereby said room temperature vulcanizable silicone composition is translucent, non-corrosive having an application rate of at least 150 g/minute and a thixotropy of 0.30 in. or less.

The invention further provides for a method of increasing the application rate of non-corrosive one-part room temperature vulcanizable silicone sealant compositions while maintaining good thixotropy.

DETAILED DESCRIPTION OF THE INVENTION

Because metal chelates impart opacity and a yellow color to room temperature vulcanizable silicone compositions, they cannot be used to formulate colorless translucent room temperature vulcanizable compositions. While tetra-alkyl titanates, such as isopropyl titanate and tetra-n-butyl titanate, are excellent condensation cure catalysts for alkoxy room temperature vulcanizable silicone compositions because they are highly miscible in siloxanes, affording colorless sealants, they cannot be used in the same fashion as the dialkyl titanium chelates. Tetra-alkyl titanate compounds tend to preferentially crosslink through the silanols and the titanate. Thus in a reaction scheme where it is desired to catalyze an endcapping reaction between a silanol polymer and methyltrimethoxysilane gelation results. In order to avoid this side reaction when a tetra alkyl titanium catalyst is used, a pre-endcapped polylalkoxy polymer is mandatory.

I now disclose that use of a pre-endcapped alkyl dialkoxy terminated diorganopolysiloxane, a reinforcing fumed silica filler, a polyalkoxy crosslinking silane, a tetra alkyl titanate condensation cure catalyst and 1,3,5-tris(3-methoxysilylpropyl)isocyanurate provides a translucent, shelf stable, non-corrosive sealant having good thixotropy and a high application rate.

The translucent, non-corrosive sealants of the present invention are comprised of:
(a) a scavenger free pre-endcapped alkyl polyalkoxy terminated diorganopolysiloxane (as taught in U.S. Pat. Nos. 4,863,992 and 4,515,932) or pre-endcapped polyalkoxy terminated diorganopolysiloxane;
(b) a reinforcing fumed silica filler;
(c) a triorganosilyl endstoppped diorganopolysiloxane;
(d) a polyalkoxysilane crosslinking agent;
(e) a tetra alkyl titanate condensation cure catalyst; and
(f) a 1,3,5-tris(trialkoxysilylalkyl)isocyanurate.

The compositions of the present invention comprise:
(a) 100 parts by weight of a pre-endcapped alkyl dialkoxy terminated polyorganosiloxane having the formula:

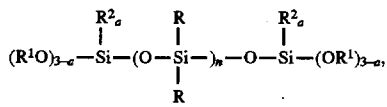

where each R and $R^2$ is independently a substituted or unsubstituted one to fifteen carbon atom monovalent hydrocarbon radical, $R^1$ is a one to eight carbon atom monovalent hydrocarbon radical or a seven to thirteen carbon atom monovalent aralkyl radical, n is a number ranging from about 50 to about 2,500 and a is zero or one, having a viscosity ranging from about 100 to about 500,000 centipoise (cps) at 25° C., preferably from about 5,000 to about 300,000 cps at 25° C. and most preferably from about 10,000 to about 150,000 cps at 25° C., wherein the terminal silicon atoms of the polymer possess at least two alkoxy groups;

(b) from about 5 to about 40 parts by weight, preferably from about 27 to 37 parts by weight and most preferably from about 29 to about 35 parts by weight per hundred parts by weight of polymer (a) of a fumed or pyrogenic silica reinforcing filler that is preferably treated;

(c) from zero t(c) from zero to about 50 parts by weight, preferably from about 5 to about 30 parts by weight, and most preferably from about 10 to about 20 parts by weight per hundred parts by weight of polymer (a) of a tri-organosilyl endstopped polymer generally having the formula:

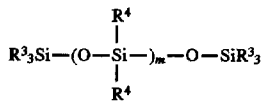

where $R^3$ is selected from the same substituents as $R^1$ and $R^4$ is selected from the same substituents as R and m is chosen whereby the viscosity ranges from about 10 to about 5,000 cps at 25° C., more preferably from about 15 to 1,000 cps at 25° C. and most preferably from about 20 to about 200 cps at 25° C.;

(d) from slightly greater than zero to about 5 parts by weight, preferably from about 0.5 to about 3.5 parts by weight and most preferably from about 1.0 to about 2.5 parts by weight per hundred parts by weight of polymer (a) of a polyalkoxysilane crosslinking agent having the formula:

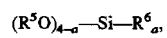

where $R^5$ is selected from the same substituents as $R^1$ and $R^6$ a is selected from the same substituents as $R_2$;

(e) from about 0.10 to about 3.0 parts by weight, preferably from about 0.50 to about 2.0 parts by weight and most preferably from about 0.8 to about 1.5 parts by weight per hundred parts by weight of polymer (a) of a titanium tetra-alkoxylate (or alternatively, a tetra alkyl titanate) condensation cure catalyst having the formula: $Ti(OR^7)_4$, where $R^7$ is a one to ten carbon atom monovalent hydrocarbon radical; and (f) from about 0.28 to about 1.50 parts by weight per hundred parts by weight of polymer (a) of a 1,3,5-tris (trialkoxysilylalkyl)isocyanurate having the formula:

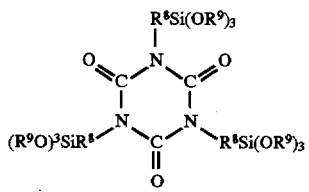

where $R^9$ is selected from the same substituents as $R^1$ and $R^8$ is a divalent hydrocarbon radical having from three to eight carbon atoms.

The tris(silylalkyl)isocyanurates have been disclosed and used as an adhesion promoting agent in a wide variety of 1-part alkoxy curing room temperature vulcanizable silicone sealant compositions, e.g. U.S. Pat. Nos. 4,863,992; 4,483,973; 4,499,234; 4,578,492; and 5,420,196. However, the enhancement of adhesion by an adhesion promoter is an effect that is measured after the room temperature vulcanizable composition has cured.

The composition thus ranges from a composition containing about 105.1 parts by weight to about 200 parts by weight of the components (a) through (f).

The non-corrosive properties of the compositions of the present invention are not obtained if methanol scavenger compounds are present. Thus the presence of amino silanes or silazane compounds would materially alter the non-corrosive aspects of the composition, because of the chemical reactions previously discussed.

While polymer (a) is generally an alkyl alkoxy endstopped diorganopolysiloxane there are specific substituents that are either preferred or simply are more convenient to use in preparing the compositions of the present invention. Thus while $R^1$ may be selected from the group of one to eight carbon atom monovalent hydrocarbon radicals that includes alkyl radicals, alkyl ether radicals, alkylketone radicals, alkylcyano radicals and seven to thirteen carbon atom monovalent aralkyl radicals, simple alkyl radicals such as methyl, ethyl, iso-propyl and n-propyl are preferred. Similar considerations obtain for the radicals R and $R^2$, where the one to fifteen carbon atom monovalent hydrocarbon radical may be selected from the group consisting of alkyl radicals, alkyl ether radicals, alkylketone radicals, alkylcyano radicals and seven to thirteen carbon atom monovalent aralkyl radicals which may be unsubstituted or where some of the hydrogen atoms of the radicals are substituted with halogens such as fluorine, chlorine, or bromine, simple alkyl radicals such as methyl, ethyl, iso-propyl and n-propyl are preferred.

The tri-organosilyl diorganopolysiloxane, component (c), functions as a plasticizer while the formula previously recited is the preferred formula, generally commercial preparations of such plasticizer compounds will be contaminated with low levels of silanol endstopped polymer. Thus there should be no more than about 500 ppm silanol groups present in the compound or mixture of compounds used as plasticizing agents.

The polyalkoxysilane crosslinking agent, component (d), while conforming to the previously recited formula is preferably selected from the group consisting of methyltrimethoxysilane, vinyltrimethoxysilane, tetramethoxysilane, methyltriethoxysilane, vinyltriethoxysilane, and tetraethoxysilane.

The tetra-alkyl titanate condensation cure catalyst while conforming to the formula previously recited is preferably selected from the group consisting of tetra-n-butyl titanate, tetra-isopropyl titanate, and tetra-(2-ethylhexyl)titanate.

It is within the scope of the present invention that while amino silane compounds and silazane compounds must be excluded from the composition in order to obtain the non-corrosive properties sought, additional corrosion inhibiting compounds may be added to the formulation. Preferred corrosion inhibiting compounds are selected from the group consisting of unsubstituted and substituted benzotriazoles.

Generally the 1,3,5-tris(trialkoxysilylalkyl)isocyanurates may be prepared by the reaction of a chloro-alkyl tri-alkoxy silane with an alkali metal cyanate in a polar non-protic solvent. A preferred compound is prepared by the reaction of chloro-propyl tri-methoxy silane with potassium cyanate in dimethylformamide. The reaction of potassium cyanate with alkyl halides typically produces isocyanates, however, the silane substituted halo-alkanes tend to cyclize to the isocyanurate. Thus:

ClCH$_2$CH$_2$CH$_2$Si(OCH$_3$)$_3$ + KCNO $\longrightarrow$ ((CH$_3$O)$_3$SiCH$_2$CH$_2$CH$_2$KCNO) + KCl ((CH$_3$O)$_3$SiCH$_2$CH$_2$CH$_2$KCNO) + KCl $\xrightarrow{\text{heat}}$

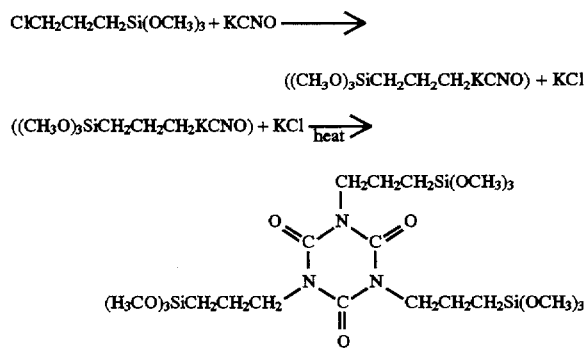

where R$^8$ is a divalent propyl radical and R$^9$ is methyl. The following experimental data indicate that R$^8$ must be at least a three carbon divalent hydrocarbon radical in contrast to the data that indicate no particular carbon number restriction upon R$^9$. Thus R$^9$ is a one to eight carbon atom monovalent hydrocarbon radical and preferably a two to eight carbon atom monovalent hydrocarbon radical.

All United States patents referenced herein are herewith and hereby incorporated by reference.

EXPERIMENTAL

Corrosion testing on copper and brass was conducted on the sealant by extruding a known weight of the silicone composition into a test jar, covering the silicone with water and suspending corrosion test coupons of brass and copper in the water that was in contact with the silicone. The procedure was repeated without the silicone as a control. The jars were maintained at 100±3.6° F. for a period of 168±4 hours (7 days). Silicone samples that discolor or corrode the test coupons are considered to have failed the test. A similar test involves testing copper wire that is encapsulated in the test silicone curing the encapsulated wire for 168±4 hours at 50±5% relative humidity at 23° C. and aging the encapsulated wire at 120±2° F. in 95–98% relative humidity for 28 days. Any showing of corrosion relative to a control indicates failure.

The measurement of thixotropy is evaluated by measuring the sag or vertical flow of the uncured sealant in a flow test jig. The flow test jig is stabilized at a temperature of 74 F., varying no more than 4 degrees Fahrenheit, and at a relative humidity of 50 percent, varying no more than 5 percent. The flow test jig possesses a recessed cavity to receive the test sealant, an ace, and a plunger among the elements of its construction. The test, commonly referred to as a Boeing test is a variant of the procedure required by two military specifications MIL-A-46106 and MIL-A-46146.

The test jig is equipped with a plunger which is used to displace the sealant sample from the recessed cavity. The recessed cavity is filled with the test sealant from a representative sample container. The adhesive-sealant must not be worked with a spatula but should leveled off even with the block containing the recessed cavity. The military specifications stipulate that the manner of leveling the adhesive-sealant sample is done by making two passes with the spatula, each starting at the center and moving towards the sides of the jig. Within 10 seconds of after the adhesive-sealant is leveled the jig is placed on its base and the plunger immediately advanced to the limit of its forward travel. The cylindrical section formed in the test flow jig is allowed to flow under its own weight on a vertical surface. The flow test begins when the plunger is advanced to the limit of its forward travel, and the flow measurement is taken immediately after the expiration of a 3 minute time period or when the flow has ceased. The flow is measured tangently from the lower edge of the plunger surface to the furthest point to which flow has occurred. The measurement taken after the 3 minute interval is considered to be the initial flow of the silicone adhesive-sealant.

EXAMPLE 1

Preparation of 1,3,5-tris(3-methoxysilylpropyl)isocyanurate

An inert reaction vessel, which may be either glass or stainless steel, was charged with 194 parts by weight of dimethylformamide and 44 parts by weight potassium cyanate. The solution was agitated under a dry nitrogen blanket which was continuously maintained over the system. After degassing with nitrogen was completed, 97 parts by weight of 3-cholorpropyltrimethoxy silane was added to the reaction mixture. The reaction mixture was brought to reflux slowly to avoid flashing and maintained at reflux, 160°–170° C., for four hours. As reaction progresses, product potassium chloride precipitates out of the reaction solution. Reaction extent may be elctro-analytically followed by potentiometry using either a potassium specific or a chloride specific electrode. The reaction mixture was cooled to 30° C. and the potassium salts removed by filtration. The filtrate was stripped under a reduced pressure of 200 mm Hg and then heated slowly to 108° C. at which point the pressure was further lowered to 25 mm Hg. These conditions were maintained for one hour. The final product, free of dimethylformamide, is water sensitive and was placed in a moisture proof container.

EXAMPLE 2

Preparation of a Scavenger Free Methyldimethoxy terminated Polydimethylsiloxane Polymer The polymer was prepared by mixing under anhydrous conditions:

1) 100 parts by weight of a hydroxy terminated polydimethylsiloxane polymer having a viscosity of 25,000 centipoise (cps) at 25° C.;
2) 2.00 parts by weight methyltrimethoxysilane;
3) 0.03 parts by weight di-n-butylamine; and
4) 0.01 parts by weight formic acid; followed by heating for 60 minutes at 80° C. which was in turn followed by heating for 2 hours at 120° C. The reaction mixture was then cooled to room temperature and analyzed by Silicon-29 NMR and found to be completely (100%) endcapped with methyldimethoxysilyl groups. The final product had a viscosity of 27,435 cps at 25° C.

EXAMPLE 3

Continuous Preparation of a Scavenger Free Non-Corrosive 1-Part RTV Composition Containing a Silylalkylisocyanurate Thixotrope All sections of a 30 mm Werner-Pfleiderer twin screw extruder were heated to 75° C. 70.95 parts by weight per hour of the scavenger free polydimethylsiloxane polymer prepared in example 2 were continuously fed to the twin screw extruder. 17 parts by weight per hour of a treated fumed silica which had been treated with octamethylcyclotetrasiloxane and hexamethyldisilazane were continuously added at barrel 1. 10.0 parts by weight per hour of a trimethylsilyl terminated polydimethylsiloxane having a viscosity of 100 cps at 25° C. was continuously added at barrel 8. A de-airing vacuum was applied at barrel 11. 0.76 parts by weight per hour, 1.0 parts by weight per hour, and 0.30 parts by weight 1,3,5-tris(3-methoxysilylpropyl)isocyanurate were continuously added at barrel 13. The sealant was produced at a rate of 40 pounds per hour. Application rates and Boeing flow were measured and are reported in table 1. This example indicates that the presence of 1,3,5-tris(3-methoxysilylpropyl)isocyanurate provides excellent rheology in terms of a high application rate and a low sag or Boeing flow when the 1,3,5-tris(3-methoxysilylpropyl) isocyanurate is present.

EXAMPLE 4

Example 3 was repeated with the exception that the 1,3,5-tris(3-methoxysilylpropyl)isocyanurate was deleted from the composition. This example demonstrates the loss of thixotropy when the 1,3,5-tris(3-methoxysilylpropyl) isocyanurate is absent from the composition.

EXAMPLE 5

Example 3 was repeated using somewhat different proportions of polymer and filler, 18 parts by weight of treated silica filler and 69.95 parts by weight of the scavenger free polymer. This example confirms the excellent rheology observed for example 3.

EXAMPLE 6

Example 5 was repeated with the exception that the 1,3,5-tris(3-methoxysilylpropyl)isocyanurate was deleted from the composition. This example demonstrates the loss of thixotropy when the 1,3,5-tris(3-methoxysilylpropyl) isocyanurate is absent from the composition, confirming example 4 at different ratios of the filler and scavenger free polymer.

EXAMPLE 7

Example 3 was repeated using 19 parts by weight treated silica filler and 68.95 parts by weight of the scavenger free polymer. The presence of 1,3,5-tris(3-methoxysilylpropyl) isocyanurate provided excellent rheology.

EXAMPLE 8

Example 7 was repeated with the exception that the 1,3,5-tris(3-methoxysilylpropyl)isocyanurate was deleted from the composition. This example demonstrates the loss of thixotropy when the 1,3,5-tris(3-methoxysilylpropyl) isocyanurate is absent from the composition, confirming example 4 at different ratios of the filler and scavenger free polymer.

EXAMPLE 9

Example 3 was repeated using 20 parts by weight treated silica filler and 67.95 parts by weight scavenger free polymer. The presence of 1,3,5-tris(3-methoxysilylpropyl) isocyanurate provided excellent rheology.

EXAMPLE 10

Example 9 was repeated with the exception that the 1,3,5-tris(3-methoxysilylpropyl)isocyanurate was deleted from the composition. This example demonstrates the loss of thixotropy when the 1,3,5-tris(3-methoxysilylpropyl) isocyanurate is absent from the composition, confirming example 4 at different ratios of the filler and scavenger free polymer.

EXAMPLE 11

Example 3 was repeated using 21 parts by weight of treated silica filler and 66.95 parts by weight of scavenger free polymer. The presence of 1,3,5-tris(3-methoxysilylpropyl)isocyanurate provided excellent rheology.

EXAMPLE 12

Example 11 was repeated with the exception that the 1,3,5-tris(3-methoxysilylpropyl)isocyanurate was deleted from the composition. This example demonstrates the loss of thixotropy when the 1,3,5-tris(3-methoxysilylpropyl) isocyanurate is absent from the composition, confirming example 4 at different ratios of the filler and scavenger free polymer.

EXAMPLE 13

Example 3 was repeated using 22 parts by weight of treated silica filler and 65.95 parts by weight of scavenger free polymer. The presence of 1,3,5-tris(3-methoxysilylpropyl)isocyanurate provided excellent rheology.

EXAMPLE 14

Example 13 was repeated with the exception that the 1,3,5-tris(3-methoxysilylpropyl)isocyanurate was deleted from the composition. This example demonstrates the loss of thixotropy when the 1,3,5-tris(3-methoxysilylpropyl) isocyanurate is absent from the composition, confirming example 4 at different ratios of the filler and scavenger free polymer.

EXAMPLE 15

Example 3 was repeated using 23 parts by weight of treated silica filler and 64.95 parts by weight of scavenger free polymer. The presence of 1,3,5-tris(3-methoxysilylpropyl)isocyanurate provided excellent rheology.

EXAMPLE 16

Example 15 was repeated with the exception that the 1,3,5-tris(3-methoxysilylpropyl)isocyanurate was deleted from the composition. This example demonstrates the loss of thixotropy when the 1,3,5-tris(3-methoxysilylpropyl) isocyanurate is absent from the composition, confirming example 4 at different ratios of the filler and scavenger free polymer.

EXAMPLE 17

Example 3 was repeated using 24 parts by weight of treated silica filler and 63.95 parts by weight of scavenger free polymer. The presence of 1,3,5-tris(3-methoxysilylpropyl)isocyanurate provided excellent rheology.

EXAMPLE 18

Example 17 was repeated with the exception that the 1,3,5-tris(3-methoxysilylpropyl)isocyanurate was deleted from the composition. This example demonstrates the loss of application rate due to the fairly high level of reinforcing silica filler present.

EXAMPLE 19

Example 3 was repeated reducing the level of 1,3,5-tris (3-methoxysilylpropyl)isocyanurate from 0.30 parts by weight to 0.20 parts by weight. The presence of 1,3,5-tris (3-methoxysilylpropyl)isocyanurate even at a lower level provided excellent rheology.

EXAMPLE 20

Example 3 was repeated reducing the level of 1,3,5-tris (3-methoxysilylpropyl)isocyanurate from 0.30 parts by weight to 0.10 parts by weight. This example demonstrates that 0.10 parts by weight of 1,3,5-tris(3-methoxysilylpropyl) isocyanurate is not sufficient to impart good thixotropy to the composition.

EXAMPLE 21

Example 3 was repeated increasing the level of 1,3,5-tris (3-methoxysilylpropyl)isocyanurate from 0.30 parts by weight to 0.40 parts by weight. This example demonstrates that there is no advantage to increasing the level of 1,3,5-tris(3-methoxysilylpropyl)isocyanurate to levels greater than 0.30 parts by weight.

EXAMPLE 22

Example 3 was repeated increasing the level of 1,3,5-tris (3-methoxysilylpropyl)isocyanurate from 0.30 parts by weight to 0.50 parts by weight. This example demonstrates that there is no advantage to increasing the level of 1,3,5-tris(3-methoxysilylpropyl)isocyanurate to levels greater than 0.30 parts by weight.

TABLE 1

Rheology Properties of Uncured 1-Part Non-Corrosive RTV Compositions Containing 1,3,5-tris(3-methoxysilylpropyl)isocyanurate

| Example No. | Thixotrope Wt. % | Filler Wt. % | Polymer Wt. % | App'n Rate gm/min. | Boeing Flow in. |
|---|---|---|---|---|---|
| 3  | 0.3 | 17 | 70.95 | 398 | 0.35 |
| 4  | 0.0 | 17 | 70.95 | 305 | 5.50 |
| 5  | 0.3 | 18 | 69.95 | 358 | 0.25 |
| 6  | 0.0 | 18 | 69.95 | 266 | 3.70 |
| 7  | 0.3 | 19 | 68.95 | 298 | 0.15 |
| 8  | 0.0 | 19 | 68.95 | 224 | 3.20 |
| 9  | 0.3 | 20 | 67.95 | 265 | 0.15 |
| 10 | 0.0 | 20 | 67.95 | 188 | 1.50 |
| 11 | 0.3 | 21 | 66.95 | 227 | 0.10 |
| 12 | 0.0 | 21 | 66.95 | 137 | 0.75 |
| 13 | 0.3 | 22 | 65.95 | 198 | 0.05 |
| 14 | 0.0 | 22 | 65.95 | 114 | 0.55 |
| 15 | 0.3 | 23 | 64.95 | 166 | 0.03 |
| 16 | 0.0 | 23 | 64.95 | 85  | 0.40 |
| 17 | 0.3 | 24 | 63.95 | 152 | 0.01 |
| 18 | 0.0 | 24 | 63.95 | 62  | 0.25 |
| 19 | 0.2 | 18 | 69.95 | 348 | 0.30 |
| 20 | 0.1 | 18 | 69.95 | 362 | 0.50 |
| 21 | 0.4 | 18 | 69.95 | 354 | 0.05 |
| 22 | 0.5 | 18 | 69.95 | 357 | 0.05 |

All of the compositions tested were non-corrosive.

EXAMPLE 23

Is a repeat of example 1 using 117.5 parts by weight of 3-chloropropyltriethoxysilane in place of the 3-chloropropyltrimethoxysilane.

EXAMPLE 24

Is a repeat of example 1 using 73.6 parts by weight of 3-chloropropyltrimethylsilane in place of the 3-chloropropyltrimethoxysilane.

EXAMPLE 25

Is a repeat of example 1 using 182 parts by weight 3-chloropropyl tris(trimethylsiloxy) silane in place of the 3-chloropropyltrimethoxysilane.

EXAMPLE 26

Is a repeat of example 1 using 3-chloropropyl methyldimethoxysilane in place of the 3-chloropropyltrimethoxysilane.

EXAMPLE 27

Is a repeat of example 1 using 70.5 parts by weight 3-chloropropyl dimethylmethoxysilane in place of the 3-chloropropyltrimethoxysilane.

EXAMPLE 28

Is a repeat of example 1 using 87.0 parts by weight chloromethyltriethoxysilane in place of the 3-chloropropyltrimethoxysilane.

EXAMPLE 29

Is a repeat of example 1 using 107.0 parts by weight of 2 chloro ethyl triethoxysilane in place of the 3-chloropropyltrimethoxysilane.

EXAMPLE 30

This is a repeat of example 1 using 79.0 parts by weight of 2-chloroethylmethyldimethoxysilane in place of the 3-chloropropyltrimethoxysilane. The silylated isocyanurates of examples 23 through 30 were each added to the composition of example 3 substituting for the 1,3,5-tris(3-methoxysilylpropyl)isocyanurate. The data are summarized in Table 2.

TABLE 2

Rheology Properties of Uncured 1-Part Non-Corrosive RTV Compositions Containing Silylated Isocyanurates

| Example No. | Thixotrope Wt. % | Filler Wt. % | Polymer Wt. % | App'n Rate gm/min. | Boeing Flow in. |
|---|---|---|---|---|---|
| 23 | 0.3 | 17 | 70.95 | 365 | 0.15 |
| 24 | 0.3 | 17 | 70.95 | 375 | 1.85 |
| 25 | 0.3 | 17 | 70.95 | 368 | 0.05 |
| 26 | 0.3 | 17 | 70.95 | 351 | 1.25 |
| 27 | 0.3 | 17 | 70.95 | 349 | 1.25 |
| 28 | 0.3 | 17 | 70.95 | 371 | 1.50 |
| 29 | 0.3 | 17 | 70.95 | 376 | 2.50 |
| 30 | 0.3 | 17 | 70.95 | 352 | 1.75 |

It is to be noted that the phrase parts by weight refers to batch preparations and when a continuous preparation is indicated, the parts by weight should be interpreted to mean parts by weight per hour if not so recited.

I claim:

1. A colorless, translucent, shelf stable, fast curing one-part room temperature vulcanizable silicone composition having good rheological properties consisting essentially of:

(a) 100 parts by weight of a scavenger free polydiorganosiloxane having the formula:

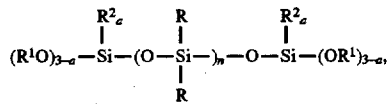

where each R and $R^2$ is independently a substituted or unsubstituted one to fifteen carbon atom monovalent hydrocarbon radical, $R^1$ is a one to eight carbon atom monovalent hydrocarbon radical or a seven to thirteen carbon atom monovalent aralkyl radical, n is a number ranging from about 50 to about 2,500 and a is zero or one, wherein said polydimethylsiloxane has a viscosity ranging from about 100 to about 500,000 centipoise (cps) at 25° C.;

(b) from about 25 to about 40 parts by weight per hundred parts by weight of polymer (a) of a fumed or pyrogenic silica reinforcing filler;

(c) from slightly greater than zero to about 50 parts by weight per hundred parts by weight of polymer (a) of a triorganosilyl endstopped diorganopolysiloxane having the formula:

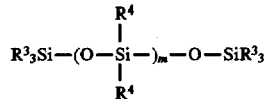

where $R^3$ is selected from the same substituents as $R^1$ and $R^4$ is selected from the same substituents as R and m is chosen so that the viscosity ranges from about 10 to about 5,000 centipoise at 25° C.;

(d) from slightly greater than zero to about 5 parts by weight per hundred parts by weight of polymer (a) of a polyalkoxysilane crosslinking agent having the formula:

$$(R^5O)_{4-a}\text{—Si—}R^6{}_a,$$

where $R^5$ is selected from the same substituents as $R^5$ and $R^6a$ is selected from the same substituents as $R_2$;

(e) from about 0.10 to about 3.0 parts by weight per hundred parts by weight of polymer (a) of a titanium condensation cure catalyst having the formula: Ti(OR$^7$)$_4$, where $R^7$ is a one to ten carbon atom monovalent hydrocarbon radical;

(f) from about 0.28 to about 1.50 parts by weight per hundred parts by weight of polymer (a) of a 1,3,5-tris(trialkoxysilylalkyl)isocyanurate having the formula:

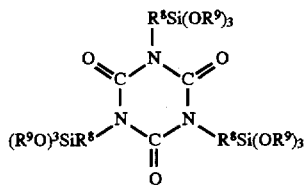

where $R^9$ is selected from the same substituents as $R^1$ and $R^8$ is a divalent hydrocarbon radical having from three to eight carbon atoms whereby said room temperature vulcanizable silicone composition is translucent non-corrosive having an application rate of at least 150 g/minute and a Boeing thixotropy of 0.30 in. or less.

2. The composition of claim 1 wherein R is selected from the group consisting of methyl, ethyl, iso-propyl, and n-propyl, and n-propyl.

3. The composition of claim 2 wherein said 1,3,5- tris (trialkoxysilylalkyl)isocyanurate is 1,3,5- tris (trimethylsilylpropyl)isocyanurate.

4. The composition of claim 3 wherein said condensation cure catalyst is selected from the group consisting of tetra-n-butyl titanate, tetra-isopropyl titanate, and tetra-(2-ethylhexyl)titanate.

5. The composition of claim 4 wherein said polyalkoxysilane crosslinking agent is selected from the group consisting of methyltrimethoxysilane, vinyltrimethoxysilane, tetramethoxysilane, methyltriethoxysilane, vinyltriethoxysilane and tetraethoxysilane.

6. The composition of claim 5 wherein said triorganosilyl endstopped diorganopolysiloxane has no more than about 500 ppm silanol groups present.

7. The composition of claim 6 wherein R is methyl.

* * * * *